United States Patent [19]

Landmeier

[11] Patent Number: 4,853,497
[45] Date of Patent: Aug. 1, 1989

[54] SHIELDING TECHIQUE FOR DIGITIZERS

[75] Inventor: Waldo L. Landmeier, Scottsdale, Ariz.

[73] Assignee: Calcomp Inc., Anaheim, Calif.

[21] Appl. No.: 208,467

[22] Filed: Jun. 20, 1988

[51] Int. Cl.$^4$ .............................................. G08C 21/00
[52] U.S. Cl. ................................................... 178/18
[58] Field of Search .............................. 178/18, 19, 20

[56] References Cited

U.S. PATENT DOCUMENTS 4,645,869  2/1987  Rockwell et al. ..................... 178/18

Primary Examiner—Stafford D. Schreyer
Attorney, Agent, or Firm—Donald A. Streck; Wm. F. Porter, Jr.

[57] ABSTRACT

A shield for use in eliminating edge effects from an electromagnetic digitizer having an active area of a grid of wires surrounded by a peripheral area of connecting wires containing sensitive interconnecting circuitry. The shield is a pan-shaped shield of a non-ferrous metal sized and shaped to fit over the underside of the grid of wires and surrounding area of connecting wires. The shield comprises a center section disposed over the active area of the grid wires and spaced from the active area so as to provide no interference with the operation thereof and an outer peripheral shielding lip that is disposed in close-spaced, non-contacting relationship to the areas of sensitive interconnecting circuitry contained within the connecting wires. The preferred shield is formed of a single blank of aluminum sheet having peripheral edge portions thereof bent into non-connected, abutting relationship at corners thereof to form the outer peripheral shielding lip.

5 Claims, 2 Drawing Sheets

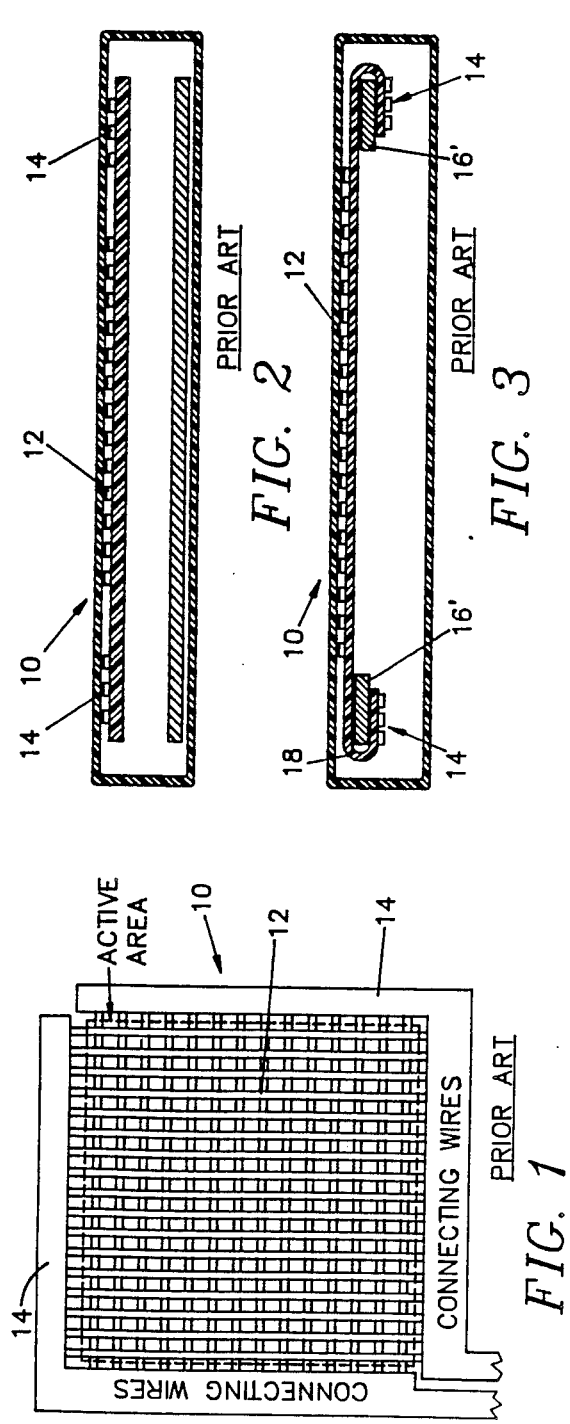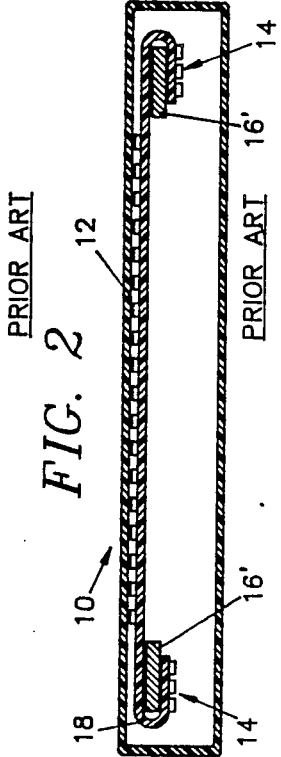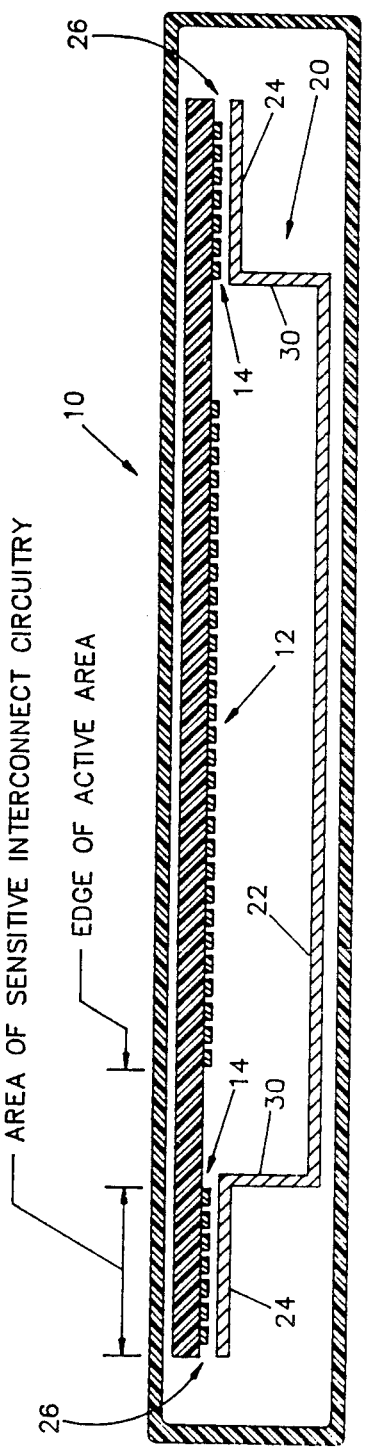

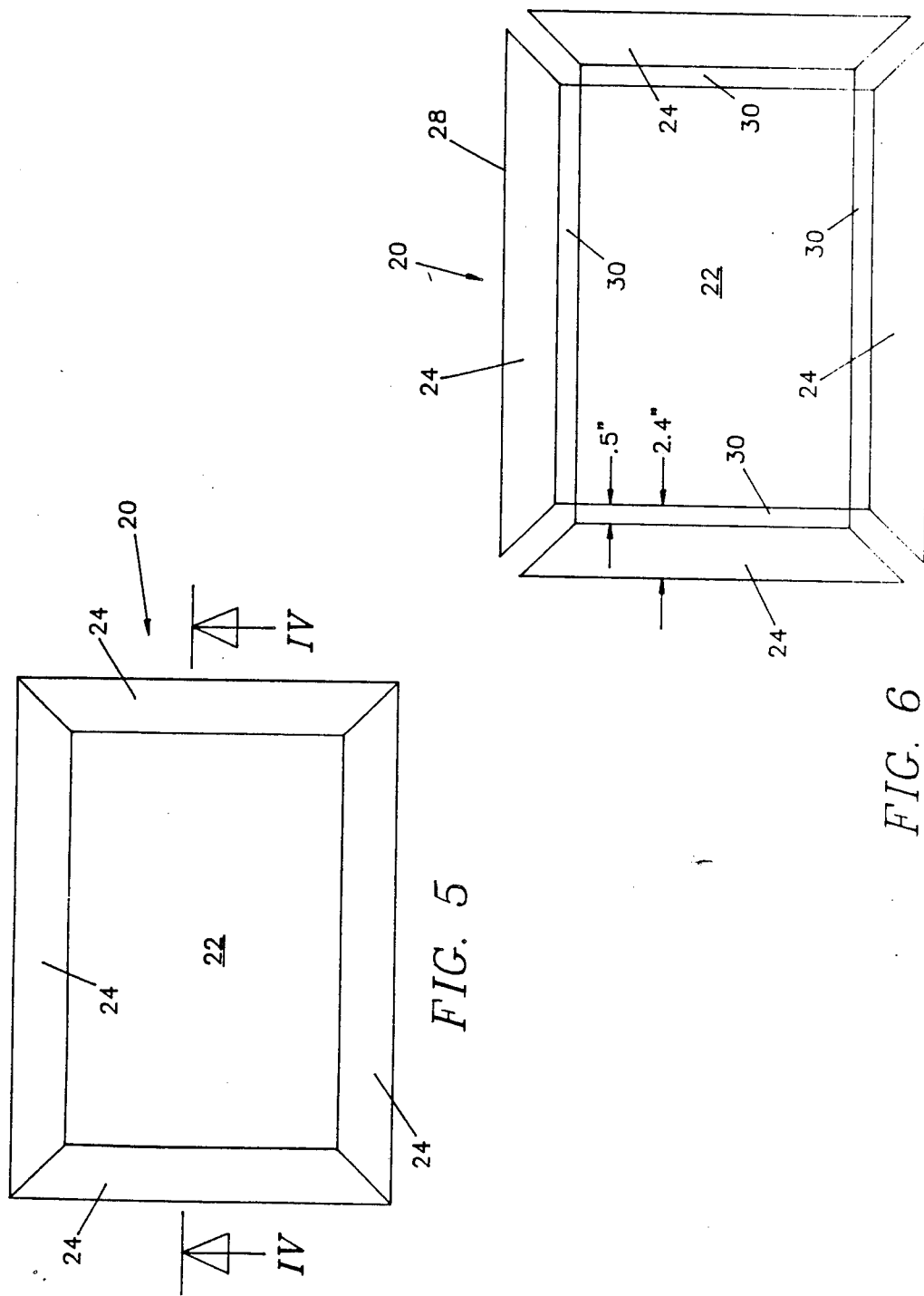

SHIELDING TECHIQUE FOR DIGITIZERS

BACKGROUND OF THE INVENTION

The present invention relates to electromagnetic digitizers and, more particularly, to a shield for use in eliminating edge effects from an electromagnetic digitizer having an active area of a grid of wires surrounded by a peripheral area of connecting wires containing sensitive interconnecting circuitry comprising a pan-shaped shield of a non-ferrous metal, the shield being sized and shaped to fit over the underside of the grid of wires and surrounding area of connecting wires, the shield comprising a center section disposed over the active area of the grid wires and spaced from the active area so as to provide no interference with the operation thereof and an outer peripheral shielding lip that is disposed in close-spaced, non-contacting relationship to the areas of sensitive interconnecting circuitry contained within the connecting wires.

An electromagnetic digitizer comprises a tablet portion such as that generally indicated as 10 in FIG. 1 and a stylus (not shown) which is moved over the tablet portion 10 to provide the digitized input to a computer, or the like. The tablet portion 10 comprises a grid of horizontal and vertical wires 12 under the surface (not shown) which are connected at their periphery to connecting wires 14. By various techniques that are not important to the present invention, electromagnetic interation is created between the grid of wires 12 and the stylus. It is this electromagnetic interaction which allows the position of the stylus on the surface of the tablet portion 10 to be sensed in order to provide the digitizing input information. The digitizing activity takes place within an "active area" of the grid wires 12 as indicated by the dashed lines so labelled.

In an electromagnetic digitizer there are usually errors created at the edge of the active area which are caused by either truncation of the electromagnetic field, unbalanced sensing, or stray radiation getting into the sensing areas. In the case of stray radiation, it is sometimes possible to protect sensitive areas by shielding the areas with a metallic plate 16 as shown in FIG. 2. Usually, such prior art shield are only partially effective and still leave considerable edge effect. Typical numbers would be plus or minus 0.030 inch error reduced to plus or minus 0.010 inch error. In digitizers where a Mylar (i.e. flexible, plastic-like sheet) grid is used such as that labelled as 18 in FIG. 3, the edge effects can almost be eliminated by wrapping the sensitive areas around a metal plate 16', thus shielding the sensitive areas. Digitizers that use a large printed circuit, (PC) card with the grid wires 12 and connecting wires 14 formed on the surface thereof are normally unable to protect these sensitive areas by either of the foregoing prior art techniques, resulting in a need for shielding and/or software error correction. Software error correction is time consuming and only somewhat effective as the exact nature of the errors is neither constant nor exactly predictable.

Wherefore, it is the object of the present invention to provide a shielding technique for digitizers that use a large PC card with the grid wires and connecting wires formed on the surface thereof which can eliminate edge effect errors up to the very edge of the active area.

Other objects and benefits of the present invention will become apparent from the description that follows hereinafter when taken in connjunction with the drawing figures that accompany it.

SUMMARY

The foregoing object has been achieved in an electromagnetic digitizer having a rectangular active area of a grid of wires surrounded by a peripheral area of connecting wires containing sensitive interconnecting circuitry by the improved, pan-shaped shield of the present invention for use in eliminating edge effects comprising, a rectangular center member of a non-ferrous metal disposed over the active area of the grid wires and spaced from the active area so as to provide no interference with the operation thereof; and, an outer peripheral shielding lip of a non-ferrous metal connected about the periphery of said center member and disposed in close-spaced, non-contacting relationship to the areas of sensitive interconnecting circuitry contained within the connecting wires.

In the preferred embodiment, the center member and shielding lip are of unitary construction and formed of a single blank of aluminum having peripheral edge portions thereof bent into non-connected, abutting relationship at corners thereof to form the outer peripheral shielding lip.

DESCRIPTION OF THE DRAWINGS

FIG. 1 is a simplified plan view of the active components of an electromagnetic digitizing tablet as wherein the present invention is employed to advantage.

FIG. 2 is a simplified cutaway side view through an electromagnetic digitizing tablet according to one prior art technique of providing shielding therefor.

FIG. 3 is a simplified cutaway side view through an electromagnetic digitizing tablet according to another prior art technique of providing shielding therefor.

FIG. 4 is a simplified cutaway side view through an electromagnetic digitizing tablet shielded according to the technique of the present invention.

FIG. 5 is a plan view of the novel shielding pan employed in the present invention.

FIG. 6 is a plan view of the sheet metal blank which is folded to produce the novel shielding pan employed in the present invention.

DESCRIPTION OF THE PREFERRED EMBODIMENT

As shown in FIGS. 4-6, the shield 20 of the present invention is in the shape of a rectangular pan with a center section 22 over the active area of the grid wires 12 which is spaced from the active area so as to provide no interference with the operation thereof and an outer peripheral shielding lip 24 that is disposed in close-spaced, non-contacting relationship to the areas of sensitive interconnecting circuitry 26 contained within the connecting wires 14. The horizontal lip 24 is connected to the horizontal center section 22 by vertical webs 30 at each of the four edges. In a tested embodiment intended for commercial use, the pan shaped shield 20 was formed from a blank 28 of 0.032 aluminum (i.e. a non-ferrous metal) as shown in FIG. 6 by bending the edges into an abutting relationship as shown in the drawings without welding or otherwise joining the abutting edges. When tested, this configuration and method of construction resulted in virtually zero edge effect up to the very edge of the active area.

Wherefore, having thus described the present invention, what is claimed is:

1. A shield for use in eliminating edge effects from an electromagnetic digitizer having a rigid rectangular circuit board therein containing an active area of a grid of wires surrounded by a peripheral area of connecting wires containing sensitive interconnecting circuitry comprising:

a pan-shaped shield of a non-ferrous metal, said shield being sized and shaped to fit over an underside of the grid of wires and surrounding area of connecting wires, said shield comprising a center section disposed over the active area of the grid wires and spaced from the active area a distance sufficient to provide no interference with the operation thereof and an outer peripheral shielding lip that is disposed in close-spaced, non-contacting relationship to the areas of sensitive interconnecting circuitry contained within the connecting wires.

2. The shield of claim 1 wherein:

said shield is formed of a single blank of metal having peripheral edge portions thereof bent into a common plane and non-connected, abutting, orthogonal relationship at corners thereof to form said outer peripheral shielding lip.

3. In an electromagnetic digitizer having a rigid rectangular circuit board therein containing a rectangular active area of a grid of wires surrounded by a peripheral area of connecting wires containing sensitive interconnecting circuitry, an improved, pan-shaped shield for use in eliminating edge effects comprising:

(a) a rectangular center member of a non-ferrous metal disposed over the active area of the grid wires and spaced from the active area a distance sufficient to provide no interference with the operation thereof; and, (b) an outer peripheral shielding lip of a non-ferrous metal connected about the periphery of said center member and disposed in a common plane and close-spaced, non-contacting relationship to the areas of sensitive interconnecting circuitry contained within the connecting wires.

4. The improved shield for a digitizer of claim 3 wherein:

said center member and shielding lip are of unitary construction and formed of a single blank of metal having peripheral edge portions thereof bent into non-connected, abuttng, orthogonal relationship at corners thereof to form said outer peripheral shielding lip.

5. In an electromagnetic digitizer having a rigid rectangular circuit board therein containing a rectangular active area of a grid of wires surrounded by a peripheral area of connecting wires containing sensitive interconnecting circuitry, the improved method of shielding to eliminate edge effects comprising the steps of:

(a) disposing a rectangular center member of a non-ferrous metal over the active area of the grid wires and spaced from the active area a distance sufficient to provide no interference with the operation thereof; and, (b) disposing an outer peripheral shielding lip of a non-ferrous metal connected about the periphery of the center member in a common plane and in close-spaced, non-contacting relationship to the areas of sensitive interconnecting circuitry contained within the connecting wires.

* * * * *